United States Patent
Kötting

(10) Patent No.: US 9,822,768 B2
(45) Date of Patent: Nov. 21, 2017

(54) WIND TURBINE HAVING A REMOTE WIND GAUGE

(71) Applicant: SSB Wind Systems GmbH & Co. KG, Salzbergen (DE)

(72) Inventor: Norbert Kötting, Neuenkirchen (DE)

(73) Assignee: SSB Wind Systems GmbH & Co. KG, Salzbergen (DE)

( * ) Notice: Subject to any disclaimer, the term of this patent is extended or adjusted under 35 U.S.C. 154(b) by 788 days.

(21) Appl. No.: 14/371,966

(22) PCT Filed: Dec. 12, 2012

(86) PCT No.: PCT/EP2012/005114
§ 371 (c)(1),
(2) Date: Jul. 11, 2014

(87) PCT Pub. No.: WO2013/104391
PCT Pub. Date: Jul. 18, 2013

(65) Prior Publication Data
US 2014/0348653 A1 Nov. 27, 2014

(30) Foreign Application Priority Data
Jan. 14, 2012 (DE) .................. 10 2012 000 716

(51) Int. Cl.
F03D 11/00 (2006.01)
F03D 17/00 (2016.01)
(52) U.S. Cl.
CPC .......... *F03D 17/00* (2016.05); *F05B 2230/80* (2013.01); *F05B 2270/32* (2013.01); *F05B 2270/8042* (2013.01); *Y02P 70/523* (2015.11)
(58) Field of Classification Search
CPC .............. F03D 17/00; F05B 2270/8042; F05B 2270/805; F05B 2270/806
See application file for complete search history.

(56) References Cited

U.S. PATENT DOCUMENTS 6,535,158 B2   3/2003   Wilkerson et al.
7,347,668 B2 *  3/2008   Pedersen .............. F03D 7/0204
                                                    416/1
(Continued)

FOREIGN PATENT DOCUMENTS

DE   10-2009-015679 A1   10/2010
DE   10-2009-040235 A1    4/2011
(Continued)

OTHER PUBLICATIONS

International Search Report (in German and English) and Written Opinion for PCT/EP2012/005114, dated Apr. 25, 2013; ISA/EP.
(Continued)

*Primary Examiner* — Richard Edgar
(74) *Attorney, Agent, or Firm* — Harness, Dickey & Pierce, P.L.C.

(57) ABSTRACT

The invention relates to a wind turbine comprising a rotor hub (7) rotating about a rotor axis (8), rotor blades (9, 10, 11) extending radially with respect to the rotor axis (8) at the same angular spacing relative to one another, and a remote wind gauge (19) that is fastened externally on the surface of the hub (7) in a mounting (20) and oriented such that wind characteristics at a distance in front of the hub (7) can be ascertained or measured, wherein the remote wind gauge (19) is arranged between two neighbouring rotor blades (9, 10) and in the radial direction of the rotor axis (8) and the mounting (20) is fastened to a respective blade bearing flange (21, 22) in the region of the connection of the rotor hub (7) to the rotor blades (9, 10), such that the remote wind gauge (19) can be retrofitted to the wind turbine (1).

19 Claims, 2 Drawing Sheets

(56) References Cited

U.S. PATENT DOCUMENTS

2010/0143136 A1* 6/2010 Daniels .............. F03D 7/0224
416/147
2013/0045110 A1 2/2013 Wagner

FOREIGN PATENT DOCUMENTS

| EP | 1770278 A2 | 4/2007 |
|---|---|---|
| EP | 2025929 A2 | 2/2009 |
| EP | 1597592 B1 | 5/2009 |
| WO | WO-2010-086631 A2 | 8/2010 |
| WO | WO-2011-150942 A1 | 12/2011 |

OTHER PUBLICATIONS

Office Action regarding DE 10 2012 000 716.7 (in German) dated Sep. 20, 2012.

* cited by examiner

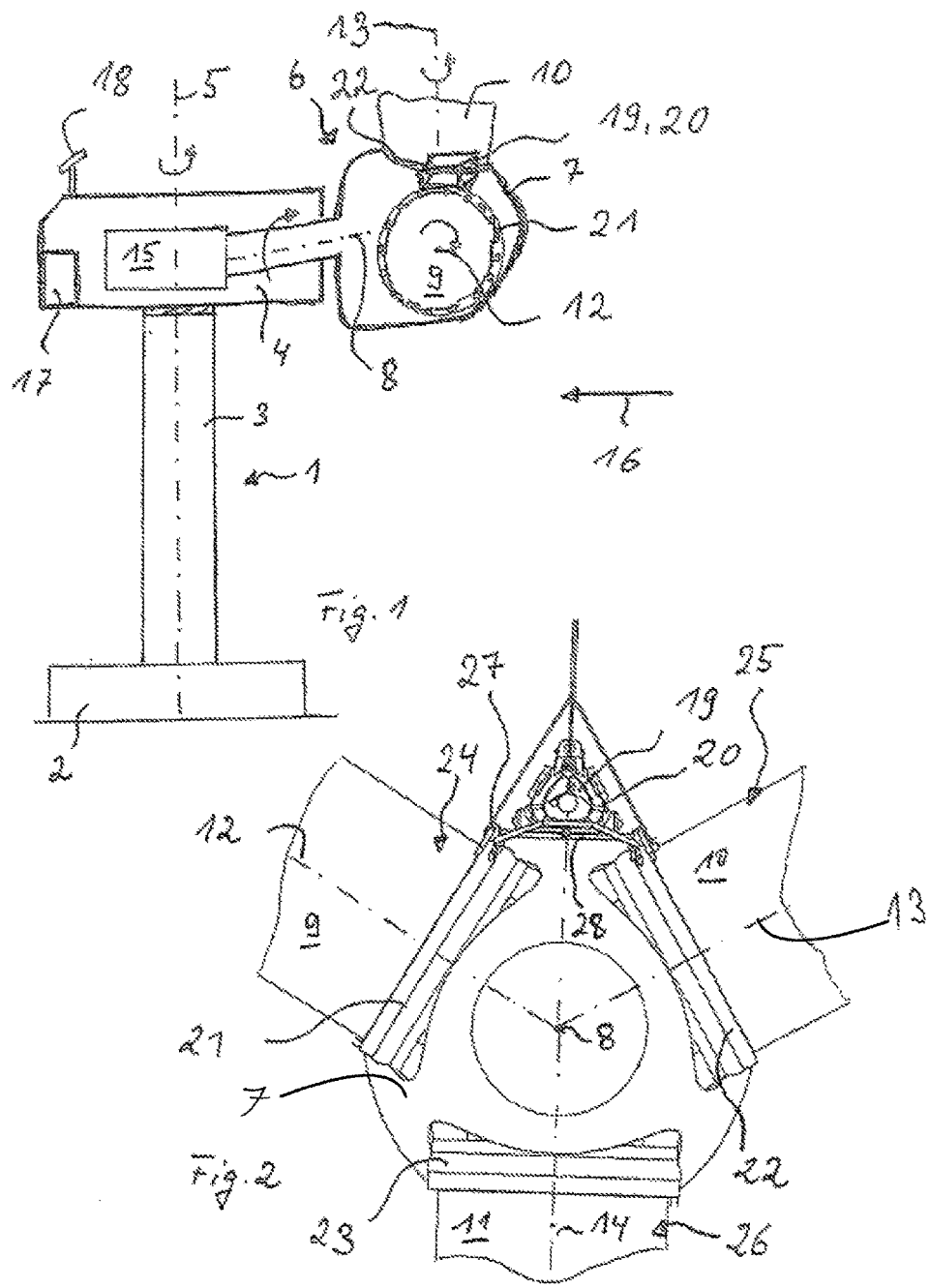

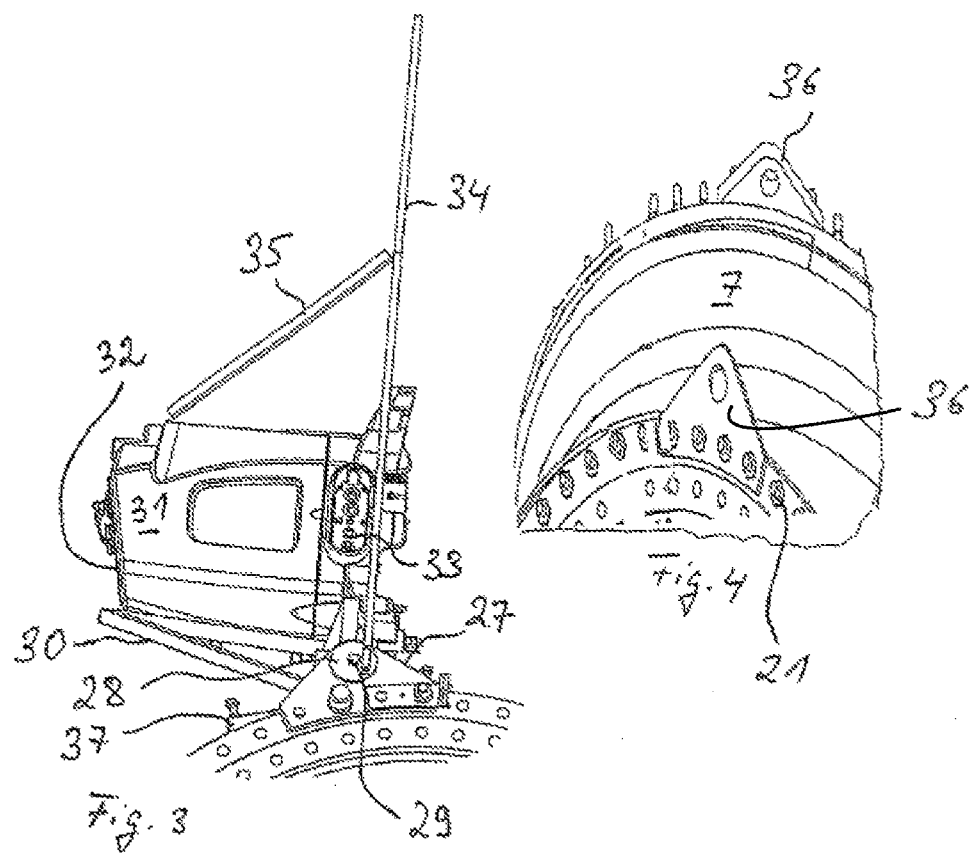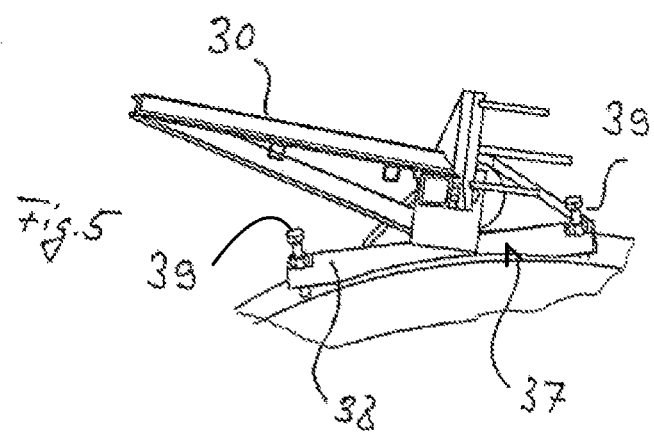

WIND TURBINE HAVING A REMOTE WIND GAUGE

CROSS-REFERENCE TO RELATED APPLICATIONS

This application is a National Stage of International Application No. PCT/EP2012/005114, filed Dec. 12, 2012. This application claims priority to German Application No. 10 2012 000 716.7, filed Jan. 14, 2012. The entire disclosures of the above applications are incorporated herein by reference.

FIELD

The invention relates to a wind turbine having a wind gauge, and more particularly to a remote wind gauge having a mount for use on the surface of a rotating hub of a wind turbine.

BACKGROUND

Compiling and measuring predictive wind characteristics (wind velocity and/or profiles) is necessary for the economic viability of wind turbines for generating electrical energy from wind power. Knowledge of wind characteristics is necessary in particular in the area of the rotation of a rotor of the turbine caused by wind, with a rotor hub and rotor blades extending radially from the rotor axis. The rotor drives an electric generator located in a fixed machine house—also described as a gondola—that generates electrical energy that is then fed into an electrical grid.

Control mechanisms are provided in the gondola, and usually also in the rotor, with which the turbine is controlled as a function of measured or calculated wind characteristics. Both the rotor and the gondola are located on a tower.

With the increasing effective output of wind turbines, their height, and consequently that of the rotor hub, increases. Associated with this, however, the precise measurement of wind characteristics at rotor height of such facilities is associated with substantial expense.

The prior art offers several possibilities with respect to ascertaining wind characteristics. The simplest, but least exact method, is a cup anemometer. A cup anemometer is a measuring device that is mounted solidly/immovably on the fixed gondola and only measures wind characteristics there at a distance from the rotating part of the turbine. The results are, however, imprecise for predictively ascertaining or measuring in front of the hub. A cup anemometer may falsify the measurement results because the results of wind measuring devices/equipment on the gondola are strongly affected by wind turbulence caused by the rotation of the rotor blades. Vertical wind shear occurring in the area of the hub and the rotor blades is not ascertained.

Remote wind measuring instruments are known that are based on the known physical principle of the optical Doppler effect. The instrument is normally set up in front of the facility or in the primary wind direction either on the ground or on a mast (Metmast) and has a remote wind gauge that transmits beams at a specific frequency in a specific direction. Specific meteorological data, including wind characteristics, can be determined from the reflected beams in front of the facility. Doppler based installations work either on the basis of electromagnetic beams (also known as LIDAR) or on the basis of acoustic waves (also known as SODAR).

U.S. Pat. No. 6,535,158 B2 shows a remote wind measurement device that is mounted on a meteorological mast (Metmast) that is set up in front of and at a distance from a wind turbine. Signals are transmitted vertically upwards from the Metmast, wherein meteorological data, including wind characteristics in front of the wind turbine, are determined from the reflected signals that are then processed into signals for controlling the wind turbine. In addition to wind characteristics, the Doppler measuring devices/instruments also ascertain vertical wind shear, where measurements have established that the vertical wind shear varies locally and over time.

The primary advantage of a remote wind measuring instrument based on the Doppler effect lies in its ability to measure wind characteristics and profiles at a great height. In particular in very uneven country where, for example, a primary wind measuring device is in a wood, a LIDAR or SODAR system makes it possible to compare a measurement with a calculation or storage of existing wind data. Above a certain hub height, however, remote wind gauges that are mounted on a Metmast are complex and expensive if they are to measure wind characteristics at the hub height of the wind turbine.

The disadvantage of such individually deployed Doppler measuring arrays is firstly that the measurement results become less precise with increasing hub height. Secondly, with the rotation of the rotor about an axis oriented perpendicular to the axis of rotation (yaw axis), a wind gauge deployed on the ground or on a Metmast identifies increasingly less precise wind characteristics in front of the hub of the wind turbine. A measurement of the yaw error of the turbine is not possible with a stationary wind gauge. Thus, this does not provide a solution to the problem of how well an existing wind turbine can follow the wind.

In order to compensate for the disadvantage of a stationary LIDAR or SODAR array, it has already been proposed in the prior art to locate such an array using a suitable mount either inside the hub or outside on its surface in order to arrive predictively at precise measurements of the wind characteristics even with a yawing motion of the turbine.

EP 1 597 592 B1 shows, for example, a wind turbine with LIDAR equipment for measuring wind characteristics in front of the hub of the wind turbine. However, the LIDAR is mounted in the interior of the hub on a mount that is not specified in much detail, and has a line of sight that is inclined to the rotational axis of the hub in order always to scan an area in front of the hub when the hub is rotating and the turbine is rotating about the yaw axis.

The disadvantage of locating the LIDAR inside the hub, however, is the small installation space available for the LIDAR inside the narrow hub, which is packed full of several other devices. Access for maintenance and repair operations, or complete later removal and installation of the LIDAR, is possible only at considerable expense. LIDAR located inside the hub has only limited suitability for a time-limited, temporary measurement of wind characteristics, to check other wind measuring devices, or to check measured values for wind characteristics stored in advance. Furthermore, it is disadvantageous that the location of the LIDAR inside the hub allows only a very limited scanning of wind characteristics in front of the wind turbine.

Remote wind gauges that are located on the surface of a rotating rotor hub of a wind turbine, and that can ascertain, or measure, predictively the wind characteristics in front of the hub are known, for example from DE 10 2009 015 679 A1 or EP 1 770 278 A1.

Remote wind gauges on the rotating hub offer the advantage that they are maintenance-friendly and offer good accessibility. In particular, turbines can be retrofitted with a remote wind gauge at no great expense and, if need be, can also be removed at no great expense.

The precondition for locating a rotating remote wind gauge on the hub is, however, a suitable mount and an attaching fixture by means of which the remote wind gauge is fastened on the rotating hub. Increased demands are made on the mount and the attachment because of their operating location with its sometimes extreme climactic, static, dynamic and kinematic requirements.

Remote wind gauges to be used outside on the hub of the wind turbine must, therefore, be enclosed by a box-shaped protective body that has to be connected to the hub in order to protect the sensitive electronics and electrical equipment of the remote wind gauge from the effects of the climate. In the case of the remote wind gauge under consideration, it is a box-shaped component measuring about 50 cm in length, with a diameter up to 1.5 m. The hub, on the other hand, comprises a cone-shaped body with a nose-shaped spinner projecting in front of the turbine, where the rotor blades extend radially at the lateral walls of the hub. In addition, a mount for the measuring equipment is required for anchoring on the surface of the wind turbine hub. Anchoring the mount for the remote wind gauge on the surface of the hub necessitates a special type of attachment and location so that the measuring equipment can fulfill its function. The known arrangements, however, offer no guidance in this regard, since apparently locating a LIDAR or SODAR on the hub is certainly cited in the literature but has so far not been implemented technically.

On the other hand, the need exists for such a mount and type of anchoring for a remote wind gauge on the hub. This is the case, for example, when turbines are retrofitted with a remote wind gauge or are equipped only temporarily with such a measuring device, either to check the wind data from other existing measuring devices or to check calculated values that are stored as control values in the turbine control system.

It is, therefore, an object of the invention to specify a suitable method of anchoring and a suitable anchorage location for the remote wind gauge on the surface of the hub for a wind turbine.

The object is achieved by a wind turbine having a remote wind gauge with a mount. Advantageous developments of the invention are cited in the dependent claims.

The wind turbine of the invention comprises a rotor hub rotating about a rotor axis with rotor blades extending radially to the rotor axis, and a remote wind gauge attached externally on the rotor hub in a mount. The mount is oriented in such a manner that wind characteristics are ascertainable, or can be measured, at a distance in front of the hub, where the wind gauge is located between two neighboring rotor blades and in the radial direction of the rotor axis, and the mount is fastened to a respective blade flange in the area where the rotor hub is joined to the rotor blades.

The remote wind gauge with a mount for use on the surface of a rotating rotor hub of the wind turbine with rotor blades extending radially to the rotor axis of the hub, by means of which wind characteristics can be ascertained, or measured, in front of the hub, is characterized in that the mount has fastening mechanisms for a detachable connection of the mount to the hub between two neighboring rotor blades at a respective blade bearing flange of the two rotor blades.

With the invention, the remote wind gauge is located with a mount on the surface of a hub of a wind turbine between two neighboring rotor blades in such a manner that the remote wind gauge is oriented parallel to the rotor axis. This alignment of the remote wind gauge ensures that when the hub is rotating a scanning field is created in front of the hub that is almost circular and is not restricted by rotating rotor blades or a spinner located in front of the hub. Wind characteristics are thus ascertained optimally in a broad area in front of the hub that are then taken to a turbine facility control system connected to the wind gauge and can be processed into control signals for the turbine, or the measured values generated by the remote wind gauge can be compared with other measured and calculated values that are generated by other measuring devices (e.g. an anemometer located on the gondola), or have been previously stored as a calculated value in the turbine control system.

No adjustments, or only minor adjustments, to the inclination setting of the measuring device to the rotational axis of the rotor are required with the proposed position of the remote wind gauge on the hub. The attachment site of the mount for the remote wind gauge additionally offers the advantage that the problem mentioned at the beginning of the present disclosure can be solved concerning to what extent an existing wind turbine can follow the wind, or to what extent current measured wind values deviate from other measured values from other measuring devices or stored calculated values from current values. Knowledge of current values has a considerable effect on the profitability of the wind turbine.

In accordance with the invention, the attachment of the mount for the remote wind gauge is effected in the area where the rotor hub is joined to the rotor blades at a respective blade bearing flange. The hubs of wind turbines usually have flange-like extensions at the point where they join the mount at which the rotor blades are attached to a respective blade bearing flange. The proposed attachment point offers the advantage that the mount of the remote wind gauge can be located securely and without additional expense on the surface of the hub. Except at the two attachment points, the mount for the remote wind gauge has no direct point of connection to the hub of the wind turbine. In this position it can be oriented or re-adjusted always parallel to the rotor axis without great effort. Expensive retrofitting or reworking in the area of the hub is not required because either existing provisions for an attachment can be used or they can be installed without great effort in the hub flange/blade bearing flange area.

This measure simplifies the assembly, or disassembly, of the wind measuring device considerably. The remote wind gauge is always removed complete with its mount on the hub, where only the mount is connected to the hub. The remote wind gauge is expediently joined in advance to its mount in a workshop or on the ground. The complete array can then be raised by a lifting mechanism or a crane, for example, from the outside onto the hub to the attaching location and attached there. Removal is likewise carried out from outside without great effort using a lifting or crane mechanism.

Moreover, the simplified installation and removal of the entire array of remote wind gauge and mount is advantageous for maintenance and repair operations because the optics and electronics of such measuring devices, rotating in the open air under extreme climatic operating conditions, make an increased maintenance and repair cycle necessary.

The respective blade bearing flange as the joining point of a rotor blade to the hub flange to which the mount for the remote wind gauge is attached advantageously includes a threaded and/or push fit connection of the blade root to the metal flange on the hub. Bushings for lengthwise bolts are laminated into the root of the rotor blade for bolting the rotor blades to the hub flange. The lengthwise bolts are guided externally at the circumference of the hub and the rotor blades and secured with nuts.

An additional holding device with an eye to attach the mount can be installed in the connecting area with the external bolt-nut area of the blade bearing flange. The holding device can be attached subsequently, in the case of an existing wind turbine, at the studs for the installation of the remote wind gauge. Alternatively, the holding device for the mount can be attached when the turbine is constructed at the point where the blade bearing flange joins the hub flange, together with the attachment of a blade bearing flange to the hub flange.

A quite particularly advantageous holding device for the remote wind gauge mount on the hub is feasible if lifting eyes for a lifting tackle are in place with the hub that is used, with which the hub is to be attached during installation to, or removal from, a turbine house or a rotor shaft, or removed using a crane or a lifting device. These lifting eyes remain in place during operation of the wind turbine. The mount can thus be attached to the two eyes at no great expense. The wind energy plants from the General Electric Company in its GE 1.5 series with a rated output of 1.5 megawatts have such lifting eyes. These lifting eyes are attached radially to the intended axis of a blade bearing flange or rotor blade for assembly of the hub on the tower.

The connecting area of a hub flange to the appropriate rotor blade also includes an array in which a supporting sleeve is provided around the hub flange, where the sleeve has a slide rail positioned around the circumference of the hub on which a transport mount is located which slides and can be clamped on the periphery of the hub, as revealed in DE 10 2009 040 235 1 for example. Following installation of the hub to the turbine house (gondola), the transport mounts can be slid on both rails on the circumference of the hub in such manner that they are positioned radially to the axis of rotation of the rotor and thus are used as a mount for the remote wind gauge.

The optics and electronics of the remote wind gauge advantageously include a measuring system that is based on a LIDAR or SODAR system. Such measuring systems are known and operate in accordance with the physical principle of the Doppler effect, which was mentioned at the beginning of the present disclosure. Such sensitive measuring devices have a box-shaped casing as protection, which is connected to the mount.

The mount is advantageously designed as a supporting frame that rests on an attaching plate. On both lateral longitudinal sides of the plate an attachment point can be advantageously provided on each side for the lifting eyes for the hub or for another type of attachment for the mount to the blade bearing flange, as described above.

Since the mount for the remote wind gauge is connected to the hub at only two attaching points, a mechanism is required to prevent tipping motions of the remote wind gauge. Such a mechanism is realized by an additional bearing arrangement that is positioned perpendicular to the connection of the two attaching points and towards the axis of rotation. The additional bearing arrangement includes a variable adjustment mechanism with which the inclination of the remote wind gauge to the axis of rotation of the rotor can be set. The adjusting mechanism can, for example, be configured as a foot that has an adjusting screw at its projecting end that is supported on the upper surface of the hub, whereby the inclination setting of the remote wind gauge to the rotor axis can be readjusted.

As a safety measure against damage to the rotor blades or the hub due to the remote wind gauge coming loose or falling from its mount, or to the mount coming loose from its attachment point to the hub, provision can be made for mechanical and/or electrical safety mechanisms that are connected to an emergency shut-down for the wind turbine, by means of which the rotation of the rotor blades is immediately stopped so that a loosened mount or a remote wind gauge that has become detached from its mount cannot result in damage to the rotor blade. An electrical series circuit of several safety mechanisms for the mount and/or the remote wind gauge is to be advantageously provided as an electrical safety mechanism that is linked to the emergency shut-down mechanism for the turbine configured as a safety chain.

As a further safety mechanism, the remote wind gauge can be provided with lightning protection. The mount includes for this purpose, as a lightning conductor, an electrical conductor that ensures an electrical connection of the mount to the hub during installation of the remote wind gauge on the hub. Thus the remote wind gauge is an integral part of the lightning protection for the entire turbine.

In the wind turbine in accordance with the invention, the wind gauge can be an integral part of the turbine controls, i.e. the wind characteristics measured are used directly or indirectly as control commands for the turbine. This arrangement is feasible when the remote wind gauge is installed permanently for operation on the hub.

Alternatively, the remote wind gauge can operate equally independently of the control system for the wind turbine. This method of operation is feasible when the remote wind gauge is to be installed only for a temporarily limited period on the turbine in order, for example, to perform comparative measurements with other existing wind measuring instruments on the facility to check their effectiveness. Intervention in an already existing pitch system with which the adjustment of the rotor blades about their axes is controlled, or in the turbine controls, is not necessary with this arrangement. The measured values of the remote wind gauge can be transmitted by remote querying independently of the turbine values to higher-level operations management and evaluated there according to need.

BRIEF DESCRIPTION OF DRAWINGS

Additional advantageous embodiments can be derived from one example of an embodiment that is explained in greater detail on the basis of the drawings in what follows.

FIG. 1 shows a schematic representation in a side view of a wind turbine having a remote wind gauge, FIG. 2 shows a schematic representation in a front view of a rotor of the wind turbine, FIG. 3 shows a side view of the remote wind gauge in a mount at its attachment point on the surface of a hub of the wind turbine, FIG. 4 shows an alternative method of attachment to FIG. 3, and FIG. 5 shows a detail of the method of attachment from FIG. 3 and FIG. 4.

DETAILED DESCRIPTION

FIG. 1 shows a wind turbine 1 that has a base 2 with an elevated tower 3, wherein a turbine house described as a gondola 4 is located on the end of the tower facing away from the base 2. The gondola 4 is carried rotatably on the tower 3 and can be pivoted about the axis 5 of the tower 3

(i.e., yaw axis 5) and can thus follow the wind direction. A rotor 6 extends away to the right from the gondola 4 that has a (rotor) axis of rotation 8 and, at the end facing away from the gondola 4, a rotor hub 7 with three rotor blades extending radially to the rotor axis 8 that are given the reference numerals 9, 10 and 11. Only rotor blades 9 and 10 are visible in FIG. 1 because of the schematic method of representation. FIG. 2 shows a schematic front view of rotor 6 from which the arrangement of the rotor blades 9, 10 and 11 can be seen. Each rotor blade 9, 10 and 11 is normally attached offset at 120° on the circumference of the hub 7.

It is further evident from FIG. 1 that each rotor blade 9, 10 is mechanically coupled to a central or individual adjusting drive (pitch drive) by means of which the respective rotor blade 9, 10 and 11 is rotated about its respective blade axis 12, 13 and 14. In addition, the rotor blades 9, 10 and 11 can be turned optimally into the wind, or away from the wind using this adjusting mechanism.

The connection between a rotor blade and a metal flange on the hub 7 is made by a first blade bearing flange 21, to which blade 9 is attached, a further blade bearing flange 22 on which blade 10 is carried, and a third blade bearing flange 23 to which blade 11 is attached. At the point of attachment to the respective rotor blade 9, 10 or 11, the hub 7 has a metal flange oriented radially to the rotor axis 8 described in what follows as the hub flange. Each hub flange has a bolt-nut connection to the pertinent rotor blade for the threaded connection to the hub 7. The end of a rotor blade 9, 10 and 11 attached to the respective blade bearing flange 21, 22 and 23 is designated as the blade root, wherein the pertinent blade root of blade 9 bears the reference numeral 24, the blade root of blade 10 the reference numeral 25, and the pertinent blade root of blade 11 the reference numeral 26.

Rotor 6 is mechanically coupled to an electric generator 15 that is located in the gondola and for the most part converts a wind force 16 acting on the individual rotor blades 9, 10 and 11 into electrical energy. A facility control system is provided for controlled operation of the wind turbine 1 by means of which the pitch drives, and thus a suitable rotor blade angle relative to the wind force 16, can be adjusted for energy conversion.

The most precise predictive measurement possible of wind characteristics in front of the wind turbine 1 is necessary for optimal control of the wind turbine, specifically at the height of hub 7. Therefore, two wind gauges 18 and 19 are provided on the turbine 1, as shown in FIG. 1.

The first measuring device 18 is an anemometer that is located on a part of the gondola 4 facing away from the rotor 6. Because of its location behind the rotor 6, its measurement is affected very strongly by turbulence caused by the rotation of the rotor blades 9, 10 and 11.

The second measuring device, with the reference numeral 19 and attached on the surface of the hub 7 in a mount 20 (see FIG. 2 in particular), is a remote wind gauge 19 that is oriented in such a way that, using this arrangement, wind characteristics at a distance from the hub 7 can be ascertained, or measured. The remote wind gauge 19 operates in accordance with the physical "Doppler effect" and is referenced herein as "LIDAR 19" if it operates on the basis of laser beams. If it operates on the basis of acoustic waves, it is referenced herein as "SODAR 19".

Because of its location, LIDAR technology or SODAR technology are both better suited for precisely determining wind characteristics for the turbine 1 than the anemometer 18 located on the gondola 4. LIDAR 19 is thus suitable as a measuring device for a comparison with the anemometer 18. Using LIDAR 19, the output of the turbine 1 can be improved or specific meteorological data stored in the turbine control system 17 can be checked and, if necessary, corrected with the aid of the LIDAR 19. Using the LIDAR 19, a check can also be performed as to how precisely the turbine 1 is following the wind force 16.

From FIG. 2 it is particularly evident that the LIDAR 19 is positioned between two neighboring rotor blades, in this example between rotor blades 9 and 13, and in a radial direction to the rotor axis 8. The mount 20 is attached in the area where the rotor hub 7 attaches to the neighboring blade bearing flanges. In FIG. 2 these are blade bearing flange 21 to blade 9 and blade bearing flange 22 to blade 10. The alignment of the LIDAR 19 is thus coaxial to the rotor axis of rotation 8 and generates an almost circular scanning field in front of the turbine 1 at the hub 7 height when rotor 6 is turning.

FIG. 3 shows in a side view the attachment of the LIDAR 19 in its mount 20 where the hub flange joins the blade bearing flange 22. The flange 22 for the mount 20 has a holding device 27 for the mount 20 at the periphery of the blade 10 (not shown expressly in FIG. 3). The holding device 27 is attached by means of a screw and bolt connection to a radially projecting collar on the hub flange. Towards the opposite attaching point for the holding device 27 on the neighboring blade bearing flange, the holding device 27 has an eye for an attaching plate 28 that has an anchoring point on each of its longitudinal sides by means of which the mount 20 is attached to the LIDAR 19 on the rotor hub 7. The mount 20 includes a cross-member 30 that is oriented in the direction of the rotor axis of rotation 8.

The sensitive electronics and optics of the LIDAR 19 are surrounded by a protective case 31 that has a window 32 facing the scanning field (on the left in FIG. 3) for the emission and reception of beams. An electrical plug is integrated into the protective case 31 for the energy supply to the LIDAR 19 and for the transmission and evaluation of measurement data to the turbine control system 17 in the gondola 4 or to a separate remote control room, not shown.

The LIDAR 19 is surrounded in its mount 20 (not expressly visible in FIG. 4) by an electrically conductive framework 35 for lightning protection that is electrically connected to the hub 7. The LIDAR 19 is thereby connected to the lightning protection system of the wind turbine 1.

FIG. 4 shows an alternative attachment point for the LIDAR 19 mount on the hub 7 of the wind turbine 1. The hub 7 has two transport or lifting eyes 36 to which lifting tackle for a crane, not shown, can be attached, by means of which the hub 7 can be connected to the rotor 6 when the turbine 1 is constructed. The two lifting eyes 36 were attached previously to the circumference of the hub 7 when it was assembled. They may be integral parts of the hub flange and remain on the circumference of the respective blade bearing flange even after assembly. Lifting eyes 36 may be set radially to the rotor axis of rotation 8. The lifting tackle of the crane can be attached later during replacement or disassembly of the hub 7 to the two lifting eyes 36. The attaching plate 28 with the mount and the LIDAR 19 can thus be fastened detachably to the lifting eyes 36.

FIG. 5 shows a variable adjustment device 37 for the carrier 30 of the mount 20. The device 37 includes an additional adjustable foot 38 located perpendicular to the attaching plate 28 and at the two attachment sites and supported on the hub 7 surface. Adjustment screws 39 are provided at the projecting end of the foot 38 by means of which the angle of inclination of the carrier 30, and thus of the LIDAR 19 to the rotor axis 8, can be adjusted.

The invention was described using the example of the LIDAR 19 arranged in a mount that is secured in a specially installed or integral lifting or locating eye of the hub 7. It is part of the scope of disclosure of the invention to use remote wind gauges that are based on another physical effect for the registration and/or measurement of meteorological data. The attachment of the mount in accordance with the invention for the remote wind gauge on the hub 7 can also be used with other types of locating devices in which a sleeve is positioned in the area of the hub flange on the circumference on which a runner with an adjustable locating device is positioned that can also be used both as a lifting device and as a holding device for the remote wind gauge.

What is claimed:

1. A wind turbine comprising:
   a rotor hub rotating about a rotor axis with rotor blades arranged at the same angular distance to each other extending radially to the rotor axis; a remote wind gauge attached externally on a surface of the hub in a mount that is oriented in such a manner that wind characteristics can be ascertained, or measured, at a distance in front of the hub;
   the remote wind gauge being located between two neighboring rotor blades and in a radial direction to the rotor axis, and;
   the mount being detachably fastened to a respective blade bearing flange in an area where the rotor hub is joined to the rotor blades, thus enabling the wind turbine to be retrofitted with the remote wind gauge.

2. The wind turbine of claim 1, wherein each one of said rotor blades is assigned to a different, respective, one of said blade bearing flanges.

3. The wind turbine of claim 1, wherein the blade bearing flange includes at least one of a threaded or push-fit connection to the hub.

4. The wind turbine of claim 1, wherein the blade bearing flanges to which the remote wind gauge is attached each have an additional, respective, holding device for the mount.

5. The wind turbine of claim 4, further comprising a separate lifting eye for use with each said blade bearing flange associated with the rotor hub, each said lifting eve being used as the holding device, where the lifting eyes are provided for the assembly/disassembly of the hub, and the lifting eyes remain on their respective said blade bearing flanges during operation of the wind turbine.

6. The wind turbine of claim 1, wherein the mount has an additional bearing array provided in the direction of an axis of rotation of the rotor hub in the attachment area to the rotor hub.

7. The wind turbine of claim 6, wherein the additional bearing array includes a variable adjusting device for adjusting an angle of inclination of the remote wind gauge with respect to the rotor axis.

8. The wind turbine of claim 1, wherein the remote wind gauge comprises a box-shaped protective case that is connected to the mount and has a window enclosed with a protective cladding permeable to beams facing in a direction where a wind measurement is taken.

9. The wind turbine of claim 8, further comprising optical and electronic devices of the remote wind gauge, which are located inside the box-shaped protective case.

10. The wind turbine of claim 1, wherein the remote wind gauge includes a LIDAR or SODAR system.

11. The wind turbine of claim 1, wherein the remote wind gauge includes at least one electrical and/or mechanical safety mechanism to prevent collision damage to the remote wind gauge from rotating rotor blades or to the wind turbine.

12. The wind turbine of claim 11, wherein the safety mechanism includes an electric series circuit comprising several safety devices including a safety chain, where the safety chain can be connected to the safety mechanism for the wind turbine.

13. The wind turbine of claim 1, wherein the remote wind gauge is an integral part of a turbine control system.

14. The wind turbine of claim 1, wherein the remote wind gauge operates independently of a turbine control system, and comparative measurements are carried out with other measuring instruments located on the wind turbine.

15. The wind turbine of claim 1, wherein the mount has attaching devices for a detachable connection of the mount with the rotor hub between two neighboring rotor blades at the respective blade bearing flanges of both rotor blades.

16. The wind turbine of claim 15, wherein the mount includes a supporting frame with an attaching plate that is connected to one part of a protective case of the remote wind gauge, and longitudinal ends of the plate include fastening devices for the respective blade bearing flange.

17. The wind turbine of claim 16, wherein the mount has a carrier oriented perpendicular to the attaching plate and in the direction of the rotor axis.

18. The wind turbine of claim 17, wherein the carrier has an adjusting device oriented towards the rotor axis.

19. The wind turbine of claim 15, wherein the mount comprises a lightning protection device connected to a lightning protection system for the wind turbine.

* * * * *